SCAMMAN & NASON.
Smut Machine.

No. 3,532.   Patented April 10, 1844.

UNITED STATES PATENT OFFICE.

SAML. SCAMMAN AND R. NASON, OF WATERVILLE, MAINE.

SMUT-MACHINE.

Specification of Letters Patent No. 3,532, dated April 10, 1844.

*To all whom it may concern:*

Be it known that we, SAMUEL SCAMMAN and RUFUS NASON, of Waterville, in the county of Kennebec and State of Maine, have invented a new and useful Improvement in Smut-Machines; and we do declare that the following is a full and exact description of the same, reference being had to the annexed drawings, in which—

Figure 1:
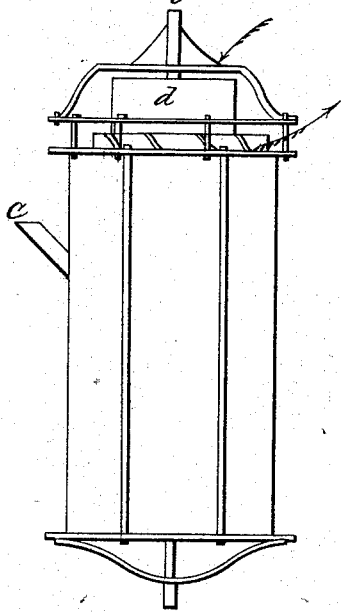
Figure 2:
Figure 3:
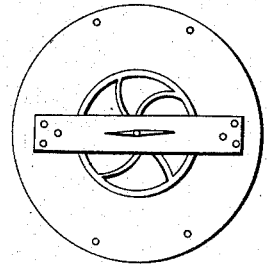
Figure 4:
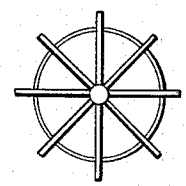
Figure 5:
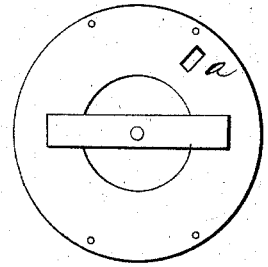

Figure 1 is an elevation. Fig. 2 is an elevation of the inner cylinder with the fans. Fig. 4 is a representation of the fans on the inner cylinder. Fig. 3 is a top view of the whole machine. Fig. 5 is a bottom view, which drawings are a part of this specification.

The nature of our invention consists in having two cylinders in a vertical position one within the other, the inner most revolving, having fans as at Fig. 2 which causes a vacuum to be formed, the bottom of the outside cylinder being closed, and the top of the inner cylinder being open the air is made to pass down the inner cylinder and up between the cylinders carrying away entirely the foreign matter which is lighter than the grain.

The advantage of our improvement over others now in use is that the foreign matter which has once passed through the machine is not again drawn through as is done by those machines where the air is taken through the bottom of the outer cylinder. The air being introduced at the top of the machine is necessarily purer, since the foreign matter falling renders the air less pure near the floor or bottom of the machine. Also dispensing with the wire cloth, and the necessity of constantly cleaning the same from the matter accumulating upon it.

To enable others to make and use our improvement we will proceed to explain its construction.

We construct our machine like any of the double cylinder machines except that we close the outermost cylinder at the bottom, leaving an aperture $a$ Fig. 5 through which the grain is discharged from the machine. The inner cylinder we leave open at the top through which the air is introduced into the machine. This cylinder we do not construct so long as the outer cylinder but at the bottom we construct say eight fans of about six inches in width as at $h$ Fig. 2. These fans by the revolution of the cylinder to which they are attached create a current of air down the inner cylinder and up between the cylinders.

The construction of our machine in other respects is like many machines now in use, the grain introduced into the machine at $c$ Fig. 1, the band for operating the machine attached at $d\ d$ Figs. 1 and 2. The beaters $e$ Fig. 2 are made like those now in use.

What we claim as our improvement and desire to secure by Letters Patent is—

The method of creating an upward current of air by fans placed at the bottom of the inner cylinder, and admitting air at the top instead of the bottom of the cylinder as is now used, by which we obviate a difficulty already explained. We disclaim the invention of the machine and all parts of it, except the fans and the method of introducing the air, in the manner and for the purposes above specified.

SAMUEL SCAMMAN.
RUFUS NASON.

Witnesses:
B. F. CHANDLER,
JOSIAH CROSBY.